July 25, 1939.　　　　I. I. TUBBS　　　　2,167,398
PNEUMATIC TIRE
Filed July 6, 1936　　　　2 Sheets-Sheet 1

Inventor:
Ira I. Tubbs
By Burton U. Hill　Atty.

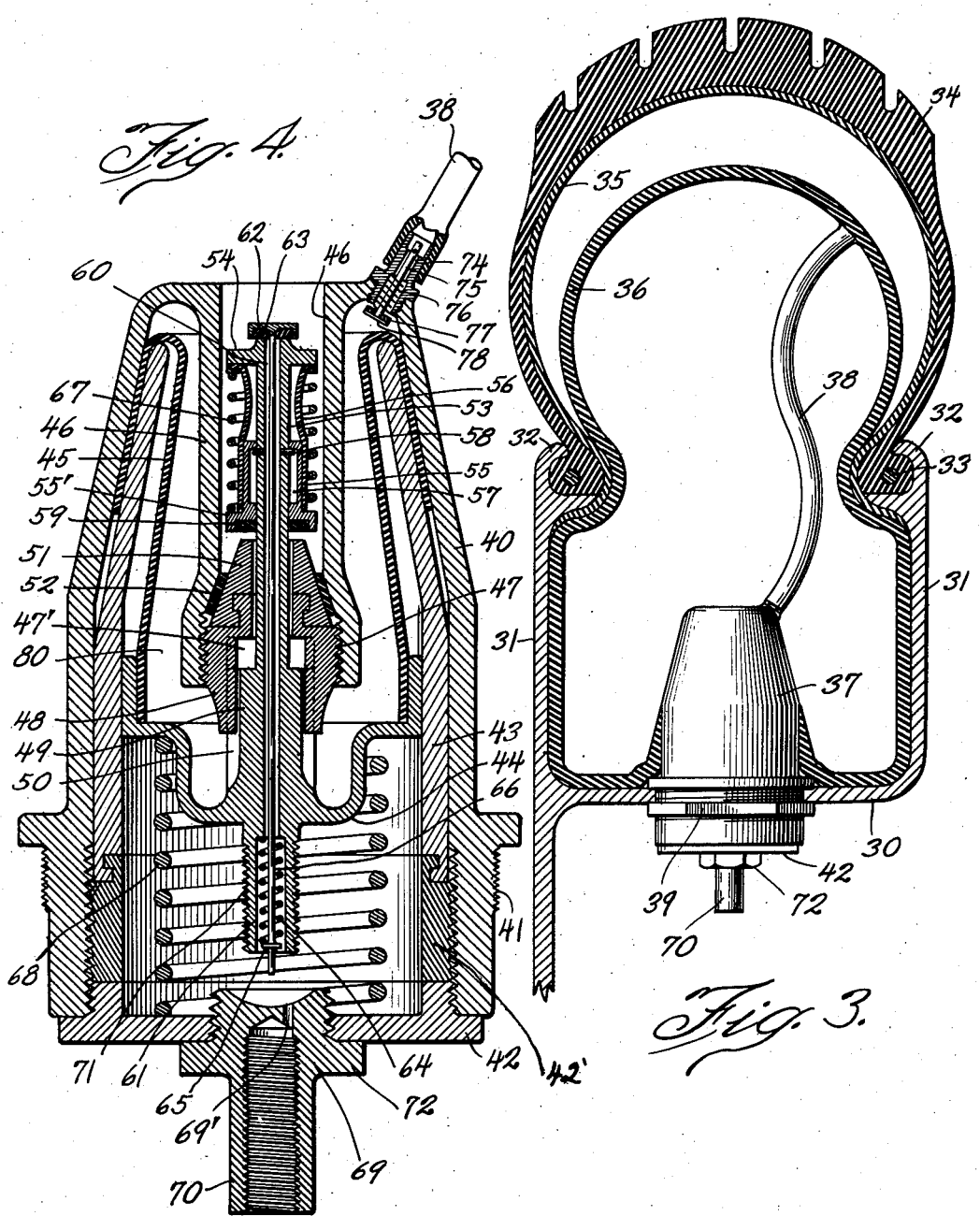

Patented July 25, 1939

2,167,398

UNITED STATES PATENT OFFICE 2,167,398

PNEUMATIC TIRE

Ira I. Tubbs, Coral Gables, Fla.

Application July 6, 1936, Serial No. 88,995

9 Claims. (Cl. 152—418)

My invention relates to that general class of devices known as resilient tires, adapted to lessen and eliminate so far as possible the shocks and inequalities of the track or surface against which the tire may be operated in service.

The object of my invention is to provide a device of the class described wherein the tire will maintain a constant predetermined resiliency during long periods of continuous operation.

A further object of my invention is to provide a tire in which suitable means are provided to prevent undue strain upon a vehicle in case a tire in use upon the wheel becomes punctured or in the event of a blow-out, to eliminate the danger of overturning or otherwise seriously injuring the vehicle and its occupants.

A further object is to enable a vehicle tire in case of an ordinary blowout, to continue to function without serious injury to the vehicle or its occupants for at least a limited time or until repairs or replacement may be effected.

These and further objects and advantages of my invention will be apparent to those skilled in the art from the following description.

In the accompanying drawings, wherein like or similar reference characters indicate like or corresponding parts—

Figure 3 is a sectional view similar to that shown in Figs. 1 and 2 but showing my improved tire upon a different type of wheel rim;

Figure 4 shows a central longitudinal section of a reducing air valve for use with my improved tire for maintaining a constant pressure in the part of my improved tire normally supporting the wheel.

Figure 1:
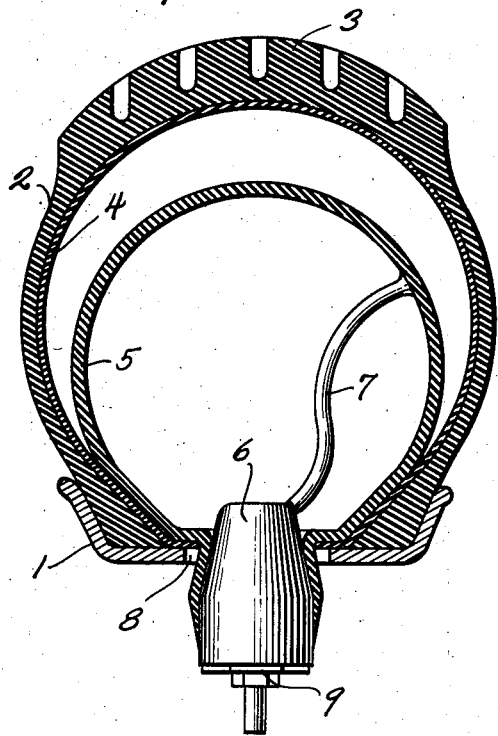
Figure 1 is a transverse radial section of my improved tire, shown mounted upon an ordinary wheel rim.

In the form shown in Figure 1, 1 is a wheel rim such as ordinarily used upon automobile or similar vehicle wheels and 2 is a pneumatic tire casing of substantially the usual or any desired form having a thickened tread 3 in all respects preferably as ordinarily constructed. An inner tube 4 of approximately the usual or any desired form or construction is provided within the casing and a secondary tube or resilient receptacle 5 is provided upon its interior. The receptacle 5 is preferably formed of rubber or other suitable material having a more inelastic supporting web, such as canvas or the like, imbedded therein to render it suitable for retaining a considerably higher air pressure than the tube 4 preferably much above the usual pressure ordinarily employed in vehicle tires, the pressure depending of course upon the type of vehicle and the kind of tire and service in which it is employed, but preferably sufficiently above the pressure in the tube to enable it to serve as a reserve or storage reservoir to supply additional air or fluid to the tire as the tire loses its fluid when in service.

As shown, a valve 6 is provided extending through the rim 1, inner tube 4 and the wall of the receptacle 5 and connected by means of the flexible conduit 7 to the wall of the receptacle 5 at any convenient point. The valve 6 extends through an opening 8 in the rim in substantially the usual manner so that a tire pump or other inflating or supply means may be attached to suitable means accessible through the outer part 9 of the valve to introduce air or other fluid through the valve to provide the necessary pressure in the receptacle 5 and through the instrumentality of the mechanism of the valve to the inner tube 4. The valve 6 which is constructed to operate as a reducing valve and automatically admit air from the receptacle to enter the tube to maintain a uniform pressure in the tube, will be hereinafter fully explained.

Figure 2:
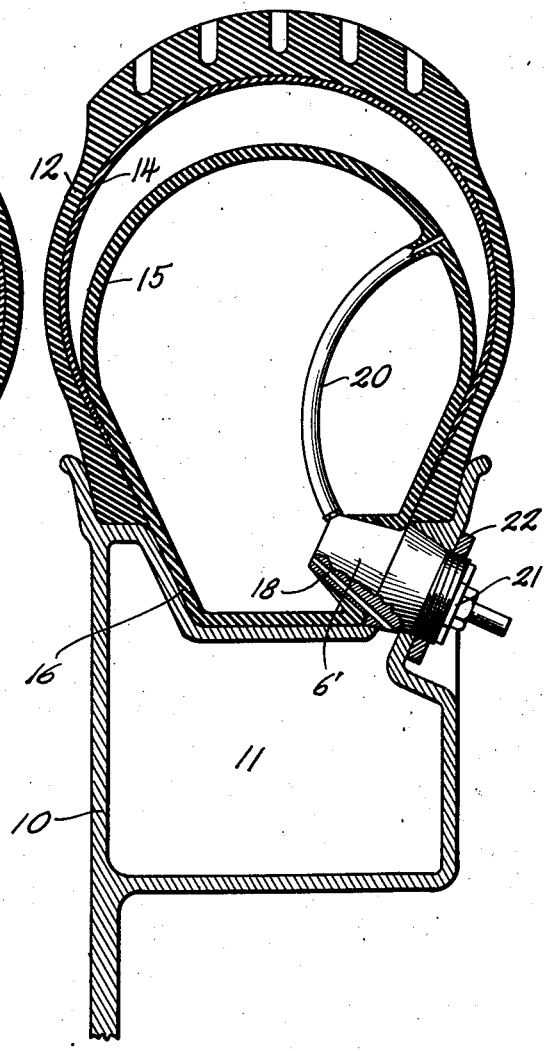
Figure 2 is a sectional view similar to that shown in Figure 1, showing my improvement mounted upon a specially designed wheel rim for use with one form of my improved tire.

In the form shown in Figure 2 I have provided a special rim 10 upon the wheel having a fluid-tight space 11 formed therein, with the outer face of the member 10 specially formed to receive my improved tire. As shown, the lateral margins of the rim 10 are formed to engage the casing 12 in substantially the usual manner. The inner tube 14, however, extends only inward to a point near the inner margins of the casing and is there cemented or otherwise securely attached to the flexible member 15 which is arranged to cooperate with a suitable recess 16 formed in the periphery of the rim member 10 to support the member 15 in position. In this form the reducing valve 6' is mounted in a suitable opening near the margin of the rim 10 adapted to form an air-tight connection with the walls of the rim and the casing of the valve is provided with a duct or passage 18 extending from a point within the receptacle near the extremity of the valve to a point near its outer end where it communicates with the space 11. A flexible conduit 20 extends from the inner end of the valve 6' to the outer wall of the receptacle 15 to direct fluid from the receptacle into the tube to maintain the desired pressure in the tube. The valve 6' is so constructed that when a tire pump or other convenient means for supplying fluid is attached through its outer end as at 21, the member or receptacle 15 together with the space 11 in the rim and inner tube 14 will be first inflated to the desired pressure for the tube 14. When this pressure is reached the valve will operate as hereinafter explained to prevent further air from entering the tube and all the air entering the valve will remain in the receptacles until for some cause when the pressure in the tube 14 falls below the predetermined amount the reducing air valve 6' will immediately operate and again permit fluid from the receptacles 15 and 11 to pass into the tube 14 and renew the pressure and maintain it at the desired working amount. The several parts are so constructed and arranged that when the nut 22 upon the valve 6' is removed, the valve may be removed from the rim with the tube 14 and receptacle 15, the receptacle being preferably cemented or otherwise securely attached to the valve.

In the form shown in Figure 3 the rim 30 is provided with extending marginal walls as at 31—31, and the outer portions of the walls 31 are provided with parts 32—32 adapted to engage the clincher part 33 upon the casing 34 to maintain the casing in position, the casing being of substantially the usual or any preferred form or construction. In this form the tube 35 extends inward preferably past the inner margins of the casing 34 and there cemented or otherwise securely attached to the flexible member 36 constructed, as hereinbefore described, with rubber or other suitable sealing means enclosing an inelastic or at least a much less elastic material adapted to sustain a materially higher pressure as hereinbefore described. The member or receptacle 36 extends into and serves substantially as an inner lining to the receptacle, at the periphery of the rim 30. When thus constructed the air valve 37 is provided to extend through the inner wall of the rim 30 and the inner wall of the flexible member 36 and is cemented or otherwise securely attached to the member 36. A flexible duct 38 extends from the reducing valve to the periphery of the flexible member 36 so that when a tire pump or other suitable inflating means is connected to the valve through the part 42, the receptacle 36 and tube 35 both will receive the air or fluid. When the pressure in the tire, however, reaches the desired amount the reducing valve will operate to prevent the fluid from passing into the tube 35, while continuing to enter the receptacle so that the pressure in the receptacle 36 may be increased as desired to provide a source of supply or reserve for maintaining the pressure in the tube. When, however, the pressure in the tube for any cause falls below the desired amount the valve 37 will operate to admit fluid to the tube and thus restore the pressure and maintain the same at the desired working amount.

In Figure 4 I have shown a preferred form of reducing air valve which may be employed with my improved tire. As shown, my improved valve comprises a casing 40 which may be of any desired form or construction such as is hereinbefore shown, provided with threads or other convenient means 41 for cooperating with a nut or other device (not shown) to positively attach the valve to a wheel rim. A part 42' is screw-threadedly mounted within the lower end of the casing 40 and a sleeve 43 is rotatably attached to part 42'. A piston 44 is slidably mounted within the sleeve 43 and a flexible bellows 45 formed of rubber or other suitable means is connected at one end to the upper part of the sleeve 43 and at its opposite end to the wall of the piston 44 so as to provide a flexible air tight connection between the piston and the sleeve.

A concentric tubular member 46 is provided within the casing 40 and extends inwardly from the upper end of the casing and is provided with a screw-threaded part 47 at its lower end. As shown a part 48 is provided arranged to engage the threads upon the part 47 and a central recess 47' is formed at its lower end. A central projection 49 upon the piston 44 is formed to slideably fit within the recess 47' and suitable longitudinal corrugations 50 or other convenient means are provided upon the cooperating faces of the recess 47' and part 49 to prevent rotation between them. In the form shown a part 51 is rotatably mounted upon the part 48 with an elastic cushion or packing ring 52 provided between the wall of the part 46 and the member 51 to prevent the escape of air or other fluid at this point. A portion 53 of the projection is of smaller diameter than the lower part of the projection and this reduced part extends upward to a point near the upper end of the casing and is there provided with a concentric flange 54. As shown, a sliding part 55 is provided upon the part 53 adapted to freely move longitudinally thereof, and a tubular flexible sleeve 56 is cemented or otherwise securely attached to the exterior of the sliding part 55 at one end; its opposite end is securely attached to the under face of the flange 54, thus providing an air-tight flexible connection between the flange 54 and the member 55. In the preferred construction shown a chamber 57 is provided in the member 55 and a projecting pin or other suitable means 58 is provided upon the member 53 with its projecting parts adapted to engage the end walls of the chamber so that when the part 53 is in the position shown supported by the spring 68, the part 58 is engaged with the member 55 and holds the member spaced from the part 51. A seat 59 formed of rubber or other suitable resilient material is preferably provided at the lower face of a flange 55' at the lower end of the member 55 adapted to cooperate with the upper face of the member 51 when the member 55 is freed from the parts 58 and permitted to engage the part 51 to prevent the passage of fluid between the parts 55 and 51.

The member 53 is provided with a central longitudinal opening 60 extending throughout its length and with a chamber 61 at its lower end. A valve 62 preferably provided with a rubber or other resilient seat 63 is provided adapted to cooperate with a central part at the upper face of the flange 54 to normally prevent the passage of air into the channel 60. As shown, a central stem 66 is provided, extending to a point below the lower end of a central projection 71 at the lower side of the piston 44 and a spring 64 within the chamber 61 engages a flange 65 upon the stem and resiliently urges the valve 62 toward its seat. A spring 67 is also provided between the flange 54 and the annular flange 55' at the lower end of the member 55 adapted to normally hold the valve seat 59 upon the part 51. In the form shown also a third spring 68 extends from the base 42 to the underside of the piston 44 to hold the piston at the upper limit of its movement with the parts 58 engaging the upper wall of the recess 57 and holding the valve 59 away from the part 51.

The base 42 is provided with a centrally positioned threaded opening and a flanged plug 69, having an air vent 69', is preferably provided to close the opening and exclude dust or other foreign substance. As shown, a part 70 is also provided upon the plug 69 having an internally threaded part so formed that if desired the part 70 may be inserted into the central opening in the base 42 and engage the threaded projection 71 upon the piston 44 to draw the piston downward and close the valve 59. The flange 72 upon the plug is provided to engage the base of the valve and thereby permanently hold the piston down and the valve 59 closed.

When thus constructed the plug 69 may be removed and a tire pump or other suitable source of fluid under pressure may be attached to the screw-threaded part 71 of the piston 44, and air or other fluid forced upward through the passage 60 and past the valve 62, the air thus entering the receptacle is free to pass downward past the flange 54 and member 55, past the valve 59 and thence around the stem 53 and between the parts 48 and 49 into the chamber 80 whence it flows through the passage 74 and flexible conduit 38 into the tube. When, however, the pressure in the tube reaches a certain predetermined amount, the pressure in the chamber 80 will force the piston 44 downward, thus permitting the spring 67 to carry the member 55 downward and close the valve 59 and prevent any further escape of fluid through the opening 74. The pressure in the receptacle may then be increased until any desired pressure is secured without further increasing the pressure in the tube.

From the foregoing it is obvious that whenever the pressure in the tube or part to which the passage 74 is connected falls below the predetermined amount, the piston 44 will be forced upward by the spring 68 and the valve 59 again raised from its seat, permitting the fluid to flow into the passage 74 and again raise the pressure to the normal working pressure desired. Under ordinary conditions when inflating the tire or the usual leakage or even leakage caused by ordinary punctures the required flow of air to the tube through the passage 74 will be comparatively small and the air velocity through the passage will be very low and will not move the valve 75, having its stem extending into the passage, to overcome the tension of the spring 76 and move the valve which is preferably provided with a resilient part 77 at its head 78 to close the passage. When, however, the escape of air from the tube is very rapid as in the event of a large puncture or a blowout, the movement of air through the passage will be very rapid and will force the valve 75 immediately to close and prevent a further loss of air. The wheel in the meantime being supported upon the flexible part of the reservoir until repairs or replacement of the injury can be made.

In case of leakage from the high pressure receptacle into the tube, the increased pressure in the chamber 80 will force the piston 44 downward until the lower end of stem 66 contacts the concave upper end of the plugs 69 and opens the valve 62, thus permitting the escape of fluid through the openings 60 and 69', and thereby relieving the excess pressure in the tube.

What I claim as new and desire to secure by Letters Patent is:

1. A pneumatic tire adapted for mounting upon a wheel, and a receptacle upon said wheel, in combination with a flexible conduit within the receptacle connecting said tire and receptacle and adapted to permit a flow of fluid from the receptacle to the tire, and means adapted to automatically control said flow and maintain a predetermined pressure in the tire.

2. A receptacle adapted for mounting upon the wheel, a flexible part upon the receptacle formed to extend concentrically beyond the periphery of said wheel and a pneumatic tire adapted for mounting upon the wheel and enclosing the flexible part upon the receptacle, in combination with a valve extending into said receptacle and a conduit within the receptacle connecting the valve to a wall of the receptacle adapted to cooperate with the valve to direct a flow of fluid from the receptacle to said tire to automatically control said flow of fluid to maintain a predetermined pressure in the time.

3. A receptacle having a flexible wall and adapted for mounting upon a wheel, and having a part extending concentrically beyond the periphery of said wheel, and a pneumatic tire adapted for mounting upon the wheel and enclosing a part of the receptacle, in combination with a valve extending into said receptacle and a conduit within the receptacle connecting the valve to a wall of the receptacle adapted to cooperate with the valve to permit a flow of fluid from said receptacle to said tire to automatically control said flow of fluid to maintain a predetermined pressure in the tire.

4. A receptacle having a flexible wall and adapted for mounting upon a wheel, and having a part projecting concentrically beyond the periphery of said wheel and a pneumatic tire adapted for mounting upon the whee and enclosing a part of the receptacle, in combination with a valve extending into said receptacle and a conduit within the receptacle connecting the valve to a wall of the receptacle adapted to cooperate with the valve to direct a flow of fluid from the receptacle to the tire, said valve being controlled by the pressure in the tire to automatically limit said flow of fluid to maintain a predetermined pressure in the tire.

5. A receptacle having a flexible wall and adapted for mounting upon a wheel to form the felloe thereof, a flexible part upon the receptacle formed concentric with and adapted to project beyond the periphery of said wheel, and a pneumatic tire mounted upon the receptacle enclosing the projecting concentric part thereof, in combination with a valve extending into the receptacle and a conduit within the receptacle connecting said valve to a wall of the receptacle and cooperating with said valve to automatically maintain a predetermined pressure in the tire.

6. In a pneumatic tire having a high pressure receptacle and a low pressure receptacle, a valve comprising a casing having an opening into the high pressure receptacle and tubular means connecting the casing to the low pressure receptacle, means for attaching an air supply to said casing and a passage from said attaching means to the opening into said high pressure receptacle, in combination with means within the casing for directing air from said high pressure receptacle to said tubular connecting means, mechanism controlling the movement of air from the high pressure receptacle to said tubular connecting means by the pressure in the low pressure receptacle, and means automatically operated by a sudden fall of pressure in said low pressure receptacle adapted to prevent the opening of said tubular connecting means.

7. In a pneumatic tire having a high pressure receptacle and a low pressure receptacle, a valve comprising a casing having an opening into the high pressure receptacle and tubular means connecting the casing to the low pressure receptacle, means for attaching an air supply to said casing and a passage from said attaching means to the opening into said high pressure receptacle, in combination with means within the casing for directing air from said high pressure receptacle to said tubular connecting means and mechanism controlling the movement of air from the high pressure receptacle to said tubular connecting means by the pressure in the low pressure receptacle, and means operable from the exterior of said casing for operating said controlling means to close the passage for air from said high pressure receptacle to said tubular connecting means.

8. In a pneumatic tire having a high pressure receptacle and a low pressure receptacle, a valve comprising a casing having an opening into the high pressure receptacle and tubular means connecting the casing to the low pressure receptacle, means for attaching an air supply to said casing and a passage from said attaching means to the opening into said high pressure receptacle, in combination with means within the casing for directing air from said high pressure receptacle to said tubular connecting means, mechanism controlling the movement of air from the high pressure receptacle to said tubular connecting means by the pressure in the low pressure receptacle, and means automatically closing said tubular connecting means actuated by a sudden fall in pressure in said low pressure receptacle, and means operable from the exterior of said casing for operating said controlling means to close the passage for air from said high pressure receptacle to said tubular connecting means.

9. In a pneumatic tire having a high pressure receptacle and a low pressure receptacle, a valve comprising a casing having an opening into the high pressure receptacle and tubular means connecting the casing to the low pressure receptacle, means for attaching an air supply to said casing and a passage from said attaching means to the opening into said high pressure receptacle, in combination with means within the casing for directing air from said high pressure receptacle to said tubular connecting means, mechanism controlling the movement of air from the high pressure receptacle to said tubular connecting means by the pressure in the low pressure receptacle, means automatically closing said tubular connecting means actuated by a sudden fall in pressure in said low pressure receptacle, means operable from the exterior of said casing for operating the controlling mechanism to close the passage for air from said high pressure receptacle to said tubular connecting means, and means for positively locking said controlling mechanism in such closed position.

IRA I. TUBBS.